United States Patent
Patel et al.

(10) Patent No.: US 10,547,560 B1
(45) Date of Patent: Jan. 28, 2020

(54) MONITORING NETWORK COMMUNICATIONS QUEUES

(71) Applicant: Juniper Networks, Inc., Sunnyvale, CA (US)

(72) Inventors: Nayan S. Patel, Bedford, MA (US); Qi-Zhong Cao, Southborough, MA (US); Nitin Kumar, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 116 days.

(21) Appl. No.: 15/856,789

(22) Filed: Dec. 28, 2017

(51) Int. Cl.
*H04L 12/863* (2013.01)
*H04L 12/26* (2006.01)

(52) U.S. Cl.
CPC .......... *H04L 47/50* (2013.01); *H04L 43/0852* (2013.01)

(58) Field of Classification Search
CPC .............................. H04L 47/50; H04L 43/0852
See application file for complete search history.

(56) References Cited

U.S. PATENT DOCUMENTS

| 8,588,241 | B1* | 11/2013 | Li | H04L 47/2441 370/412 |
| 10,277,518 | B1* | 4/2019 | Matthews | H04L 47/50 |
| 2014/0119230 | A1* | 5/2014 | Huey | H04L 43/0858 370/253 |
| 2017/0054784 | A1* | 2/2017 | Panattu | H04L 65/80 |

* cited by examiner

*Primary Examiner* — Kyaw Z Soe
(74) *Attorney, Agent, or Firm* — Harrity & Harrity, LLP

(57) ABSTRACT

A network device may include a controller and a hardware forwarding component. The hardware forwarding component may receive a network packets and assign the network packets to multiple network queues. The network device may also obtain, using a microcode engine of the hardware forwarding component, and for each of the network queues, a measurement of queue depth, each measurement of queue depth being obtained from memory of the hardware forwarding component. Based on the measurements of queue depth, the network device may generate and transmit a telemetry packet.

20 Claims, 4 Drawing Sheets

MONITORING NETWORK COMMUNICATIONS QUEUES

BACKGROUND

Network devices, such as routers, switches, and/or the like, may handle data in the form of network packets (e.g., data packets). Network devices often uses queues when handling network packets, e.g., in a manner designed to handle network packets that are being sent and received at a high rate of speed. For example, network packets that enter a network device may be placed into one or more queues until the network device is capable of processing the network packets.

SUMMARY

According to some implementations, a network device may comprise: a controller; and a hardware forwarding component to: receive a plurality of network packets; assign the plurality of network packets to a plurality of network queues; obtain, by a microcode engine of the hardware forwarding component and for each of the plurality of network queues, a measurement of queue depth, each measurement of queue depth being obtained from memory of the hardware forwarding component; generate, based on the measurements of queue depth, a telemetry packet; and transmit the telemetry packet.

According to some implementations, a device may comprise: a first processor; and a microcode engine implemented in hardware of a second processor, the microcode engine causing the second processor to: obtain, for a network queue, a measurement of queue depth, the network queue being implemented by the second processor, and the measurement of queue depth being obtained from memory of the second processor; generate, based on the measurement of queue depth, a telemetry packet; and transmit the telemetry packet.

According to some implementations, a method may comprise: obtaining, by hardware forwarding component of a network device and for a plurality of network queues implemented by the hardware forwarding component, at least one measurement of queue depth, the at least one measurement of queue depth being obtained from memory of the hardware forwarding component; generating, by the hardware forwarding component and based on the at least one measurement of queue depth, a telemetry packet; and transmitting, by the hardware forwarding component, the telemetry packet.

DETAILED DESCRIPTION

Figure 1:
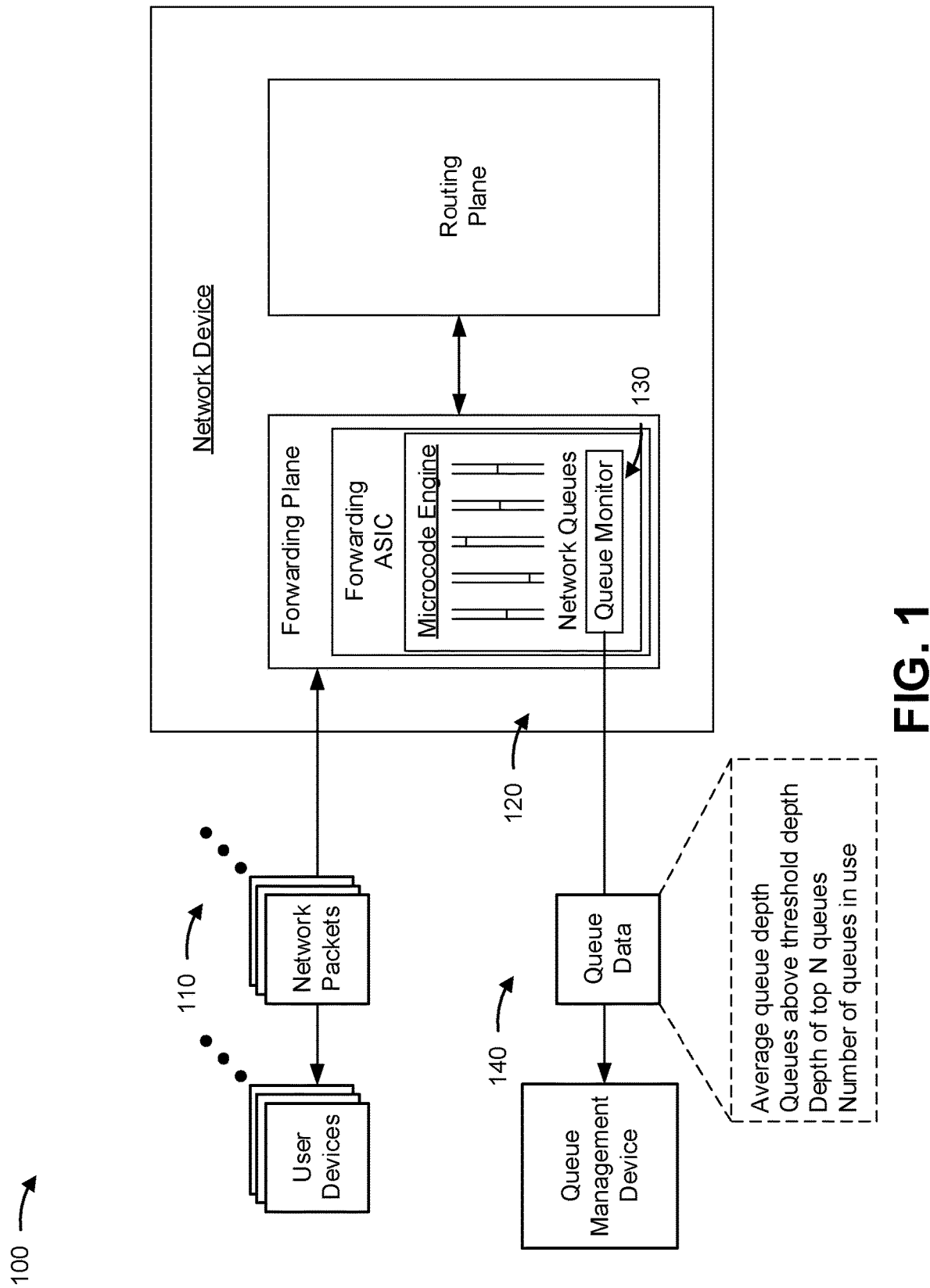
FIG. 1 is a diagram of an overview of an example implementation described herein.

The following detailed description of example implementations refers to the accompanying drawings. The same reference numbers in different drawings may identify the same or similar elements.

Network devices, including switches, routers, load balancers, firewalls, and/or the like, are often designed to quickly handle network packets. In situations where a network device receives a large volume of network traffic, the network device may make use of queues for temporarily storing network packets, e.g., in a manner designed to ensure that the network device has time to handle all of the network packets that the network device receives. The amount of network traffic that can be stored in a network device's queues may vary, and is limited (e.g., by hardware and/or software). In some situations, one or more queues of a network device may become highly saturated, or full (e.g., due to a burst in network traffic), causing delays in transmission of network packets and/or dropped network packets.

Some implementations, described herein, provide a network device that is capable of monitoring its own network queues in a manner designed to enable detection of bursts of network traffic, which may further enable handling of potential network traffic problems caused by bursts of network traffic. For example, the network device may include a microcode engine implemented in a processor designed to handle network traffic, such as a forwarding application specific integrated circuit (ASIC). The microcode engine may include a queue monitor that is able to quickly sample network queues that are used by the microcode engine to facilitate the handling of network packets. In some implementations, the queue monitor may generate a telemetry packet that includes data regarding the status of the network queues (e.g., based on the sampling), and the telemetry packet may be forwarded to a separate device (e.g., a queue management device) in communication with the network device.

In this way, a network device may be able to quickly detect potential problems in network communications, enabling diagnosis and correction of the potential problems. By implementing a queue monitor in the forwarding plane of the network device (e.g., in a forwarding ASIC or other special purpose hardware), a burst of network traffic may be detected in near real time. In addition, in implementations where the queue monitor is implemented in a forwarding ASIC of a network device may conserve other network device resources, e.g., by obviating the need for a line card processor, routing processor, or other processor to monitor queues. The use of the forwarding ASIC may also enable faster queue monitoring, as the network queues are implemented in the forwarding ASIC. Furthermore, telemetry packets that include the queue data can be transmitted quickly when handled by the forwarding ASIC, e.g., by handling the telemetry packets from within the forwarding plane and obviating the need for telemetry packets to be transmitted through the routing plane. Improvements in the speed of detecting bursts of network traffic may facilitate improved network monitoring and potential fault resolution, e.g., by providing other devices and/or network administrators with information regarding the state of network queues in near real time.

As used herein, a network packet may refer to a communication structure for communicating information, such as a protocol data unit (PDU), a data packet, a frame, a datagram, a segment, a message, a block, a cell, a frame, a subframe, a slot, a symbol, a portion of any of the above, and/or another type of formatted or unformatted unit of data capable of being transmitted via a network.

FIG. 1 is a diagram of an overview of an example implementation 100 described herein. As shown in FIG. 1, example implementation 100 may include user devices (e.g., home computers, mobile phones, server computers, and/or the like) which may provide, via a network, data in the form of network packets (e.g., internet protocol (IP) packets) destined for other user devices. Example implementation 100 may further include a network device (a switch, a router, a customer premises device, an internet service provider (ISP) device, an edge device, a core device, a firewall, and/or the like), which may be responsible for forwarding network packets and performing one or more other operations, such as routing, encryption, load balancing, switching, security, and/or the like. In addition, the example implementation 100 includes a queue management device (e.g., a computer, mobile phone, server device, and/or the like), which may be any device designed to handle data relating to network queues.

As shown in FIG. 1, and by reference number 110, the user devices may provide multiple network packets, which may be associated with any kind of network traffic, to the network device (e.g., through one or more input/output ports of the network device). The network device may include a variety of components in the forwarding plane (e.g., the plane in which network packets are received and forwarded) and the routing plane (e.g., the plane in which network device logic is applied to network packets to determine how the network packets should be routed). The example network device includes a forwarding ASIC, which may receive the network packets as the network packets enter the network device.

As further shown in FIG. 1, and by reference number 120, the forwarding ASIC includes a microcode engine that places the incoming network packets into queues, or buffers, until the network packets are ready to be forwarded (e.g., out to another user device and/or to the routing plane). After the destination of a network packet is determined (e.g., by the forwarding ASIC and/or microcode engine), the forwarding ASIC is responsible for forwarding the network packet, e.g., toward the intended destination of the network packet or to the routing plane for further processing.

As further shown in FIG. 1, and by reference number 130, the microcode engine includes a queue monitor that is designed to periodically measure the depth of the network queues. In some implementations, due to the hardware implementation of the queue monitor, the queue depth measurements may be made in near real time (e.g., in times measured in microseconds for each queue depth measurement). As the network device may include many thousands of network queues, the speed at which the hardware implemented queue monitor measures queue depth may enable relatively quick sampling of all of the network queues. In the example implementation 100, the queue monitor also periodically forms one or more telemetry packets in which the queue depth measurements, or other data based on the queue depth measurements, may be included. The data may include, for example, average queue depth measurements, a number of queues above a threshold depth or saturation level, a depth of the top most saturated queues, depth measurements for all queues in use, and/or the like.

As further shown in FIG. 1, and by reference number 140, the queue monitor transmits the telemetry packets to a queue management device. The queue management device may use the data included in the telemetry packets to perform a variety of functions, including determining whether an issue is occurring or has occurred with network communications being handled by the network device, diagnosing the cause of network communications issues, solving network communications problems identified based on the data included in the telemetry packets, and/or the like.

As noted above, by implementing a queue monitor in the forwarding plane of the network device (e.g., in a forwarding ASIC), bursts of network traffic may be detected in near real time. In addition, other network device resources may be conserved, e.g., by obviating the need for a line card processor, routing processor, or other processor to monitor network queues. In addition, telemetry packets, that include the queue data, can be transmitted quickly when handled by the forwarding ASIC, e.g., by obviating the need for telemetry packets to be transmitted through the routing plane. Improvements in the speed of detecting bursts of network traffic may facilitate improved network monitoring and potential fault resolution, e.g., by providing the queue management device with information regarding the state of network queues in near real time.

As indicated above, FIG. 1 is provided merely as an example. Other examples are possible and may differ from what was described with regard to FIG. 1.

Figure 2:
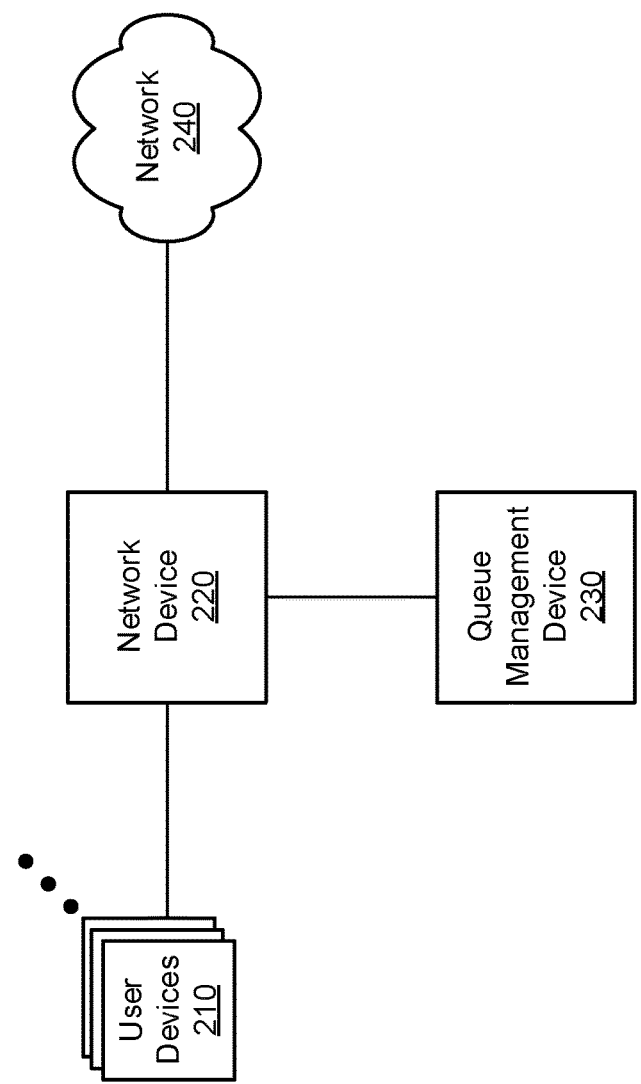
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210, a network device 220, a queue management device 230, and a network 240. Devices of environment 200 may interconnect via wired connections, wireless connections, or a combination of wired and wireless connections.

User device 210 includes one or more devices capable of receiving, generating, storing, processing, and/or providing information associated with network packets. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a personal computer, a server computer, or a similar type of device. User device 210 may include a variety of applications, such as a web browsing application, entertainment application, communications application, and/or the like, for generating internet protocol packets to be transmitted to and/or received from other user devices 210 via a network (such as network 240).

Network device 220 includes one or more devices capable of receiving, generating, storing, processing, and/or providing information related to network packets and network queues. For example, network device 220 may include a firewall, a router, a gateway, a switch, a hub, a bridge, a reverse proxy, a server (e.g., a proxy server), a security device, an intrusion detection device, a load balancer, or a similar device. In some implementations, network device 220 may be responsible for forwarding network packets received by network device, e.g., as part of a network (such as network 240). In some implementations, network device 220 may include a processor, such as a forwarding ASIC, that implements a microcode engine designed to place incoming network traffic into one or more network queues. The microcode engine may also implement a queue monitor designed to periodically sample the network queues, create one or more telemetry packets based on queue depth measurements obtained from the sampling, and transmit the telemetry packets to another device, such as queue management device 230. In some implementations, network device 220 may be a physical device implemented within a housing, such as a chassis. In some implementations, network device 220 may be a virtual device implemented by one or more computer devices of a cloud computing environment or a data center. Although FIG. 2 shows a single network device 220, in practice, there may be hundreds, thousands, millions, etc. of network devices 220.

Queue management device 230 includes one or more devices capable of receiving, generating, storing, processing, and/or providing information associated with queue depth measurements. For example, queue management device 230 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a personal computer, a server computer or a similar type of device. In some implementations, queue management device 230 may be implemented by one or more virtual machines implemented by one or more computer devices of a cloud computing environment or a data center. Queue management device 230 may include a variety of applications designed to facilitate the detection and/or remediation of potential problems that are based on queue depth measurements associated with network device 220. Queue management device 230 may, in some implementations, be associated with one or more network administrators, such as administrators of network 240, which may include network device 220 and/or one or more user devices 210.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
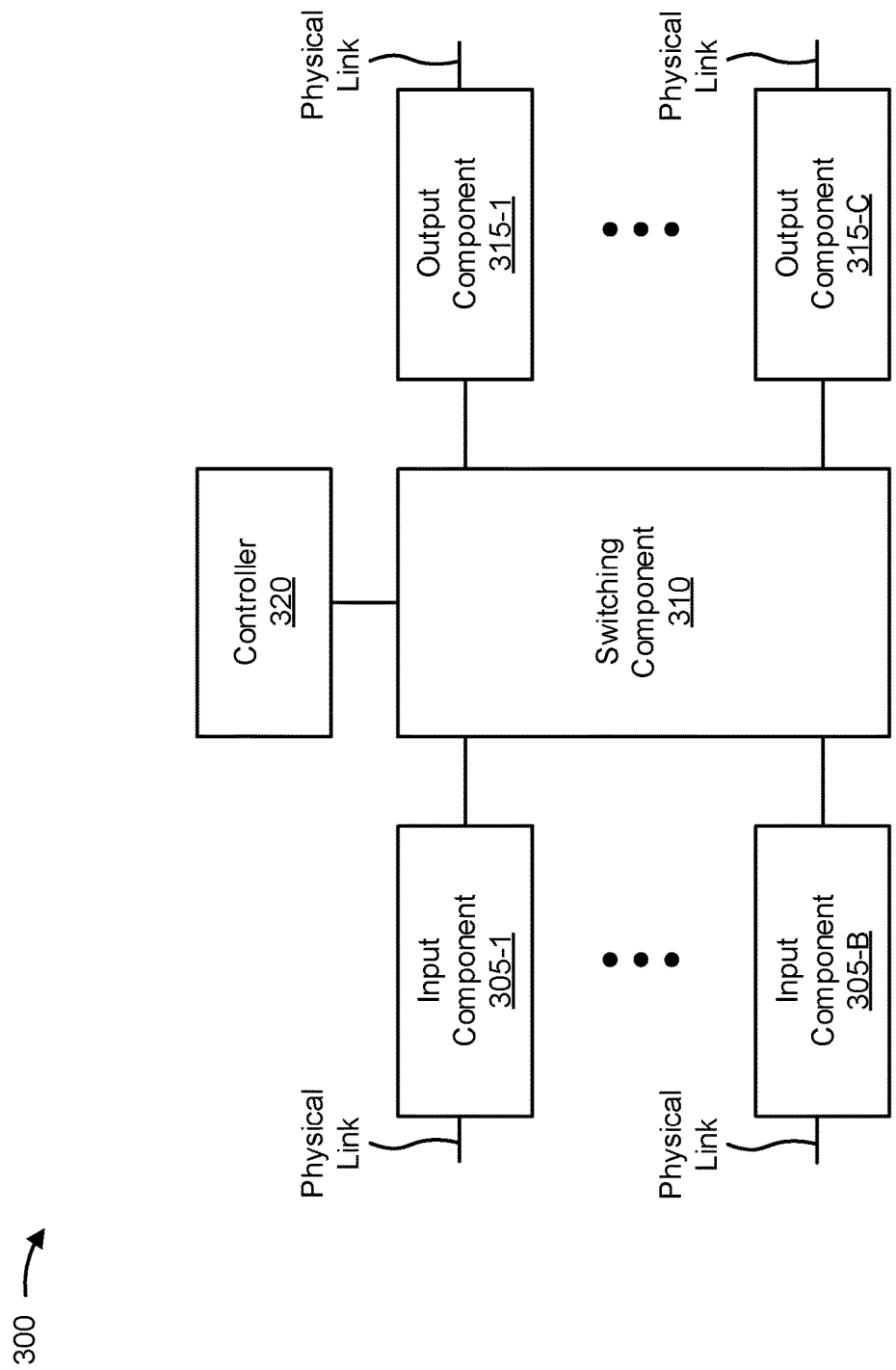
FIG. 3 is a diagram of example components of one or more devices of FIG. 2.

FIG. 3 is a diagram of example components of a device 300. Device 300 may correspond to user device 210, network device 220, and/or queue management device 230. In some implementations, user device 210, network device 220, and/or queue management device 230 may include one or more devices 300 and/or one or more components of device 300. As shown in FIG. 3, device 300 may include one or more input components 305-1 through 305-B (B≥1) (referred to collectively as input components 305, and individually as input component 305), a switching component 310, one or more output components 315-1 through 315-C(C≥1) (referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), forwarding ASICs, packet forwarding components, line card controller components, input ports, processors, memories, and/or input queues. In some implementations, device 300 may include one or more input components 305.

Input component 305 may perform one or more processes described herein. In some implementations, input component 305 may perform these processes using hardwired circuitry, such as an ASIC and/or field-programmable gate array (FPGA). Implementations described herein are not limited to any specific combination of hardware circuitry and/or software.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, forwarding ASICs, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315, such as in a hardware forwarding component, which may include a forwarding ASIC, forwarding FPGA, and/or the like).

Output component 315 may perform one or more processes described herein. In some implementations, output component 315 may perform these processes using hardwired circuitry, such as an ASIC and/or FPGA. Implementations described herein are not limited to any specific combination of hardware circuitry and/or software.

Controller 320 includes a processor in the form of, for example, a central processing unit (CPU), a graphics processing unit (GPU), an accelerated processing unit (APU), a microprocessor, a microcontroller, a digital signal processor (DSP), an FPGA, an ASIC, and/or another type of processor. A processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
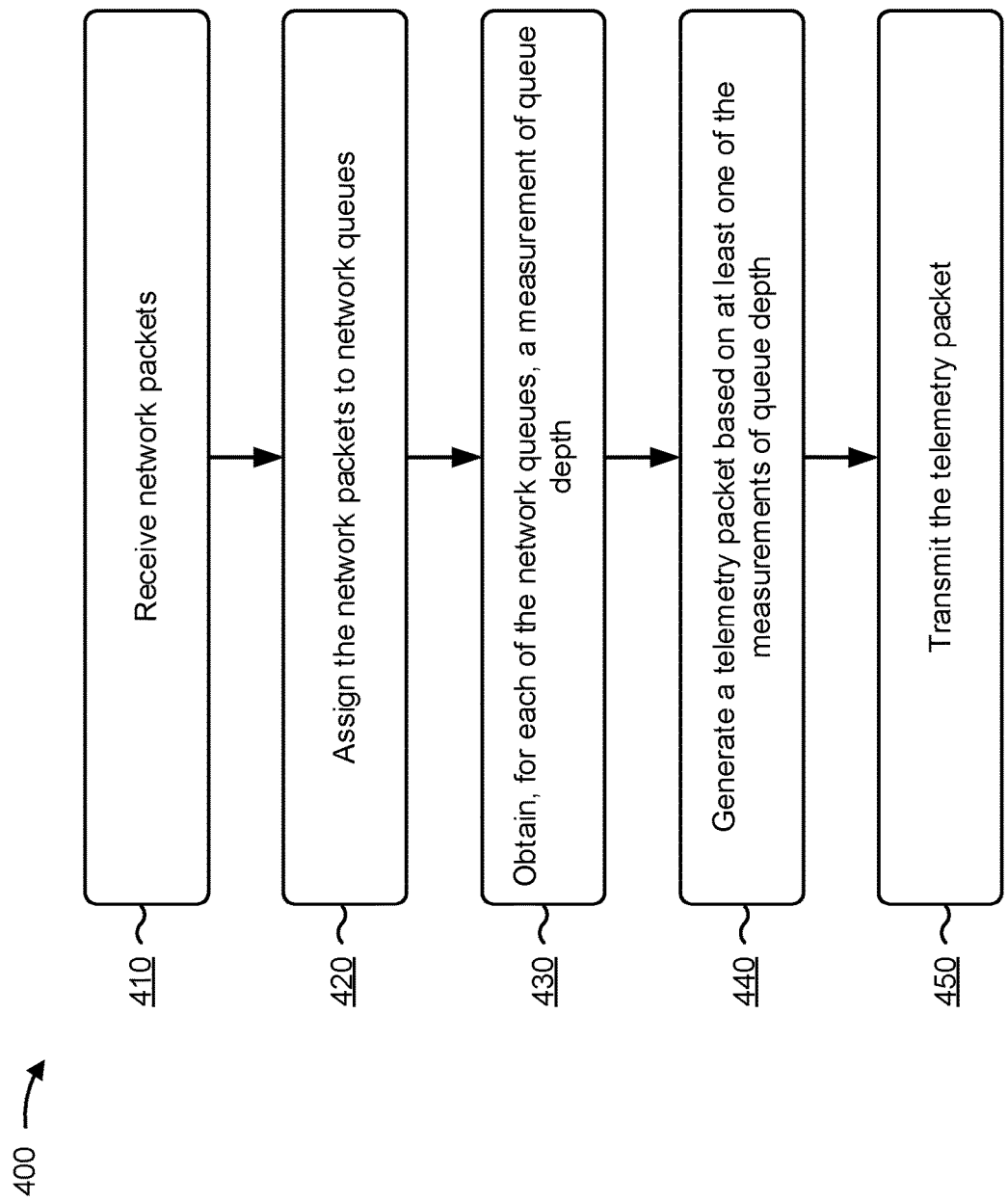
FIG. 4 is a flow chart of an example process for monitoring network queues.

FIG. 4 is a flow chart of an example process 400 for monitoring network queues. In some implementations, one or more process blocks of FIG. 4 may be performed by network device 220, e.g., such as input component 305 and/or a component that includes a combination of input component 305 and/or output component 315, such as a hardware forwarding component (e.g., a hardware-implemented forwarding ASIC, forwarding FPGA, and/or the like). In some implementations, one or more process blocks of FIG. 4 may be performed by another device or a group of devices separate from or including network device 220, such as user device 210 or queue management device 230.

As shown in FIG. 4, process 400 may include receiving network packets (block 410). For example, network device 220 (e.g., input component 305, such as a forwarding ASIC) may receive multiple network packets. In some implementations, network device 220 may receive the network packets from one or more user devices 210 or from one or more network devices in communication with one or more user devices 210. The network packets may have been sent for a variety of purposes and include a variety of different types of packets, such as hypertext markup language (HTML) packets, network messaging packets, micro-blog packets, Internet of Things (IoT) packets, audio packets, video packets, and/or the like.

In some implementations, the network packets may include IP packets. In some implementations, the network packets may be addressed to a variety of different destinations. In some implementations, the network packets may also be of varying sizes (e.g., up to the maximum transmission unit (MTU) for the devices operating on network 240). In some implementations, network device 220 may receive the network packets in a manner designed to facilitate transmission of the network packets from one user device 210 to another, which may include performing one or more operations on the network packets (e.g., forwarding, routing, encryption, security inspection, load balancing, and/or the like).

In this way, network device 220 may receive network packets, enabling network device 220 to assign the network packets to network queues.

As further shown in FIG. 4, process 400 may include assigning the network packets to network queues (block 420). For example, network device 220 (e.g., input component 305, such as the forwarding ASIC) may assign the network packets that are received by network device 220 to network queues to await further action. By way of example, a microcode engine implemented in the forwarding ASIC of input component 305 may assign network packets to network queues, e.g., based on sources, destinations, input ports, output ports, flows, sessions, protocols, priority information, quality of service information, class of service information, types of network packets, and/or the like associated with the network packets.

In some implementations, network device 220 may include thousands or more network queues. Network device 220 may assign network packets to network queues based on a variety of factors, including the source and/or destination of the network packets, network flows associated with the network packets, input and output ports associated with the network packets, protocols used by the network packets, type associated with the network packets, quality of service values associated with the network packets, and/or the like. Network queues may, in some implementations, be implemented in high speed memory included in hardware of network device 220, such as flash memory, content addressable memory (CAM), ternary content addressable memory (TCAM), and/or the like.

During operation, network device 220 often adds and removes network packets from the network queues at a high rate of speed, e.g., as network packets are received by and transmitted by network device 220. In some situations, bursts of network traffic may cause one or more network queues to fill, which may cause network packets to be dropped (e.g., network packets that cannot be stored in the network queue or a queue overflow buffer that stores network packets that cannot be stored in a network queue) and/or may cause increased latency for the network packets that are stored in a full network queue (or in a queue overflow buffer). The burst of network traffic may be caused, for example, by multiple sources sending multiple network packets to be stored in the same network queue, speed mismatch between ingress and egress interfaces (e.g., a 100G/40G ingress interface forwarding network packets to a 10G/1G egress interface or to a queue that is shaped at a lower rate), multicast replication done by an egress packet forwarding component to a large number of receivers on the same egress interface, a malicious actor attempting to transmit a high volume of traffic (e.g., as in a Denial of Service (DoS) or Distributed DoS (DDoS) attack), and/or the like. Accordingly, while network device 220 is capable of assigning network packets to network queues in a manner designed to enable quick handling of the network packets, in some situations bursts of network traffic may fill and/or oversaturate one or more of the network queues. Due to the manner in which network packets are assigned to network queues, some network queues may be more heavily utilized than others, and queue utilization, or saturation, may change rapidly, e.g., depending on the network packets transmitted to and/or from network device 220.

In this way, network device 220 may assign network packets to network queues. The use of network queues may enable network device 220 to monitor the network queues, e.g., by obtaining measurements of queue depth, in a manner designed to facilitate detection of potential problems that may be caused by bursts of network traffic at the network device 220. In addition, the use of hardware to assign network packets to network queues may enable network device 220 to operate faster than if software were used to assign network packets to network queues, and may enable assigning network packets to network queues in real time or near real time.

As further shown in FIG. 4, process 400 may include obtaining, for each of the network queues, a measurement of queue depth (block 430). For example, network device 220 may obtain (e.g., using a microcode engine implemented in a forwarding ASIC of network device) a queue depth measurement for each of the network queues. A queue depth measurement may be obtained, for example, by sampling a network queue to determine how full the network queue is.

The measurement of queue depth may take a variety of forms, including a value indicating an amount of data stored in a network queue, an amount of free space remaining in a network queue, a percentage of capacity at which the network queue is utilized, and/or the like. By way of example, the measurement of queue depth obtained for a network queue may be represented by a value that indicates the percentage of the network queue that is utilized at the time of measurement, e.g., a value of 0.75 may indicate that the corresponding network queue is 75% full.

In some implementations, network device 220 may sample (e.g., obtain queue depth measurements for) all of the network queues, while in some implementations network device 220 may sample a portion of the network queues. Sampling all of the network queues may be designed to increase the accuracy of information reported based on queue depth measurements, while sampling fewer than all of the network queues may conserve resources relative to implementations where all network queues are sampled. In some implementations, the number of network queues sampled may depend on the sampling speed, the number of queues, the frequency at which network device 220 reports queue data, and/or the like.

In some implementations, network device 220 may sample the network queues by using one or more sensors configured to obtain queue depth measurements. By way of example, an inline keep-alive session operating on input component 305 (e.g., implemented in microcode engine of the forwarding ASIC) may be configured to obtain queue statistics for network queues by traversing the network queues using corresponding queue identifiers for each of the network queues and obtaining the statistics (e.g., the measurements of queue depth) for each traversed network queue. In some implementations, the keep-alive session may be configured to use multiple sensors, e.g., each sensor configured to obtain queue depth measurements for a separate subset of network queues, in a manner designed to enable queue depth measurements to be performed in parallel. While described as being implemented as part of the keep-alive session operations of a forwarding ASIC, in some implementations, the measuring of queue depth may occur, in part or in whole, as part of a microcode operation separate from the keep-alive session (e.g., in an operation separately configured to perform queue monitoring).

Network device 220 may obtain queue depth measurements at a variety of rates, which may depend on a variety of factors, such as how many network queues are to be sampled, how frequently queue data is to be exported, and how quickly network device samples the network queues. For example, in a situation where network device 220 is designed to detect short duration bursts in network traffic, network device 220 may be configured to obtain queue depth measurements for all of the network queues at a high rate of speed. By way of example, in a situation where queue data is to be sent in intervals of 50 milliseconds, network device 220 may be configured in a manner designed to ensure that all of the network queues are sampled within the 50 milliseconds, with time left over to generate a telemetry packet for reporting the queue data (e.g., to queue management device 230).

In some implementations, addition or removal of a network queue may lead to a change in configuration of the forwarding ASIC, e.g., to enable sampling, or stop sampling, of the added/removed network queue. For example, the microcode engine may, upon detection of a network queue being added or removed, set a flag indicating the change in the network queues. Based on the flag, the microcode engine may (e.g., between intervals of obtaining and reporting queue data) update the scheduling of the sensors to include/exclude the added/removed network queues.

By using hardware (e.g., the forwarding ASIC) to sample the network queues, network device 220 may be able to quickly (e.g., in real time or near real time) measure queue depth for some or all of the many network queues that may be implemented in network device 220. In some implementations, network device 220 may include multiple forwarding ASICs, and each forwarding ASIC may be associated with a subset of network queues and each forwarding ASIC may include a microcode engine configured to sample the network queues associated with the forwarding ASIC in which the microcode engine is configured.

In this way, network device 220 may obtain a measurement of queue depth for each of the network queues, enabling network device 220 to generate a telemetry packet reporting queue data to queue management device 230, e.g., in a manner designed to enable the appropriate handling of potential problems identified based on bursts of network traffic.

As further shown in FIG. 4, process 400 may include generating a telemetry packet based on at least one of the measurements of queue depth (block 440). For example, network device 220 (e.g., input component 305, such as the forwarding ASIC) may generate a telemetry packet based on at least one of the measurements of queue depth. The telemetry packet may be any type of packet, including a standards based packet (e.g., IP packet, Google protocol buffer (GPB) packet, and/or the like) or proprietary packet, capable of being used to transmit queue depth measurement data. Network device 220 may periodically generate telemetry packets (e.g., in regular intervals designed to provide frequent updates regarding the depth of the network queues), and in some implementations, multiple telemetry packets may be generated to store queue depth measurement data for one queue sampling interval.

A variety of information based on the queue depth measurements may be included in the queue depth measurement data that is included in a telemetry packet. For example, queue depth measurement data may include average queue depth measurements, a number a queues above a threshold depth or saturation level, a depth of the top most saturated queues, depth measurements for all queues in use, and/or the like. As noted above, the queue depth measurement data may be included in multiple telemetry packets and/or in a single telemetry packet.

In some implementations, network device 220 generates the telemetry packet using hardware included in the forwarding plane (e.g., the forwarding ASIC and included microcode engine). By way of example, the microcode engine implemented in the forwarding ASIC may be configured to include (e.g., in the keep-alive session) one or more operations designed to generate the telemetry packets on the forwarding ASIC. In this situation, the microcode engine may encode the queue depth measurements obtained from the network queues to encode the queue depth measurement data into a format for transmission.

In this way, network device 220 may generate a telemetry packet based on at least one of the measurements of queue depth, enabling network device 220 to transmit the telemetry packet, including the queue depth measurement data, to queue management device 230. In addition, the use of hardware to generate telemetry packets may enable network device 220 to operate faster than if software were used to generate telemetry packets, and may enable generation, and transmission, of telemetry packets in real time or near real time (e.g., line rate).

As further shown in FIG. 4, process 400 may include transmitting the telemetry packet (block 450). For example, network device 220 may transmit the telemetry packet, e.g., to queue management device 230. In some implementations, the transmission of the telemetry packet may occur periodically, e.g., based on a predetermined reporting time, such as every 50 ms, every 1 second, and/or the like). In some implementations, multiple telemetry packets may be transmitted, where each telemetry packet includes queue depth measurement data. In this situation, network device 220 may transmit the telemetry packets in bursts, e.g., in a manner designed to minimize potential interference with normal network device 220 operations.

In some implementations, the network device 220 may transmit the telemetry packet using input component 305 (e.g., in implementations where input component 305 and output component 315 are implemented in the same device, such as the forwarding ASIC of a network switch). For example, the forwarding ASIC may be configured to obtain the queue depth measurement data from memory and generate one or more telemetry packets to include the queue depth measurement data. The forwarding ASIC may also be configured to perform the routing lookup, encapsulation, segmentation, and/or the like before forwarding the telemetry packet to queue management device 230, e.g., through an egress port of network device 220 identified by the routing lookup. In this situation, the transmission of the network packet may be handled within forwarding plane hardware (e.g., using data available in memory of input component 305), which may obviate the need for the telemetry packet to be transmitted to the routing plane (e.g., in situations where routing lookup and/or transmission via another component of network device 220 is not required). This may enable network device 220 to quickly transmit the queue depth measurement data to queue management device 230.

As noted above, the queue depth measurement data included in the telemetry packet may vary. The manner in which queue management device 230 uses the queue depth measurement data may depend upon the information included in the queue depth measurement data. For example, queue management device 230 may use the queue depth measurement data to determine when one or more network queues have met a threshold measure of depth, or occupancy, e.g., in a manner designed to determine that the network queues that meet the threshold are experiencing a burst of network traffic. Due to the hardware implementation (e.g., the in-line gathering of queue depth measurements and telemetry packet reporting performed on the forwarding ASIC), queue management device 230 may have real time or near real time information regarding a potential problem with network device 220, such as potential dropped network packets, increased latency, and/or the like. While described as providing queue depth measurement data in telemetry packets to queue management device 230, network device 220 may transmit queue depth measurement data to another device or devices, such as a storage device, another network device 220, and/or a user device 210.

In this way, network device 220 may transmit the telemetry packet, enabling other entities, such as queue management device 230 and/or a network administrator, to review real time or near real time network queue statistics. The network queue statistics provided to queue management device 230 and/or a network administrator may enable queue management device 230 and/or the network administrator to use the data included in the telemetry packets to perform a variety of functions, including determining whether an issue is occurring or has occurred with network communications being handled by network device 220, diagnosing the cause of network communication issues, solving network communication problems identified based on the data included in the telemetry packets, and/or the like. Due to the use of hardware to obtain and report the network queue statistics in real time or near real time speed, queue management device 230 and/or the network administrator may be provided with network queue statistics much more frequently and for more precise periods of time than would otherwise be possible (e.g., in implementations that use software and/or separate devices to measure network queue statistics), further facilitating diagnosis and resolution of potential network communication problems.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations, described herein, provide a network device 220 that is capable of monitoring its own network queues in a manner designed to enable detection of bursts of network traffic, which may further enable handling of potential network traffic problems caused by bursts of network traffic. For example, the network device 220 may include a microcode engine implemented in a processor designed to handle network traffic, such as a forwarding application specific integrated circuit (ASIC). The microcode engine may include a queue monitor that is able to quickly sample network queues that are used by the microcode engine to facilitate the handling of network packets. In some implementations, the queue monitor may generate a telemetry packet that includes data regarding the status of the network queues (e.g., based on the sampling), and the telemetry packet may be forwarded to a separate device (e.g., a queue management device 230) in communication with the network device 220.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold might refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. As used herein, the term "or the like" is intended to be inclusive (e.g., as in "and/or the like"), unless explicitly stated otherwise. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
   a controller; and
   a hardware forwarding component to:
      receive a plurality of network packets;
      assign the plurality of network packets to a plurality of network queues;
      obtain, by a microcode engine of the hardware forwarding component, during a keep-alive session implemented by the microcode engine, and for each of the plurality of network queues, a measurement of queue depth,
         each measurement of queue depth being obtained from memory of the hardware forwarding component;
      generate, based on the measurements of queue depth, a telemetry packet; and
      transmit the telemetry packet.

2. The network device of claim 1, where the hardware forwarding component, when obtaining the measurement of queue depth, is to:
   obtain the measurement of queue depth for all network queues implemented by the microcode engine.

3. The network device of claim 1, where the hardware forwarding component, when obtaining the measurement of queue depth, is to:
   obtain the measurement of queue depth using a queue sensor configured to sample the plurality of network queues.

4. The network device of claim 1, where the hardware forwarding component, when obtaining the measurement of queue depth, is to:
   obtain the measurement of queue depth using a plurality of queue sensors configured to sample the plurality of network queues.

5. The network device of claim 4, where:
   each of the plurality of queue sensors is configured to sample a separate portion of the plurality of network queues.

6. A device, comprising:
   a first processor; and
   a microcode engine implemented in hardware of a second processor, the microcode engine causing the second processor to:
      obtain, for a network queue, a measurement of queue depth,
         the network queue being implemented by the second processor, and
         the measurement of queue depth being obtained from memory of the second processor;
      generate, based on the measurement of queue depth, a telemetry packet;
      identify an egress port for the telemetry packet from memory of the device; and
      transmit the telemetry packet using the identified egress port.

7. The device of claim 6, where the second processor is a field-programmable gate array (FPGA).

8. The device of claim 6, where the second processor is an application specific integrated circuit (ASIC).

9. The device of claim 8, where the ASIC is a forwarding ASIC of a network device.

10. The device of claim 6, wherein the second processor, when obtaining the measurement of queue depth, is to:
    obtain the measurement of queue depth during a keep-alive session implemented by the microcode engine.

11. A method, comprising:
    obtaining, by hardware forwarding component of a network device and for a plurality of network queues implemented by the hardware forwarding component, at least one measurement of queue depth,
       the at least one measurement of queue depth being obtained from memory of the hardware forwarding component;
    generating, by the hardware forwarding component and based on the at least one measurement of queue depth, a telemetry packet;
    identifying an egress port for the telemetry packet from memory of the hardware forwarding component; and
    transmitting, by the hardware forwarding component and using the identified egress port, the telemetry packet.

12. The method of claim 11, where generating the telemetry packet includes:
   generating the telemetry packet in the memory of the hardware forwarding component.

13. The method of claim 11, where the telemetry packet includes data specifying an average queue depth for at least one of the plurality of network queues.

14. The method of claim 11, where the telemetry packet includes data specifying, for one of the at least one measurement of queue depth, how close a corresponding network queue, of the plurality of network queues, is to being at full capacity.

15. The method of claim 11, further comprising:
   generating, based on the at least one measurement of queue depth, at least one additional telemetry packet; and
   transmitting the at least one additional telemetry packet.

16. The method of claim 15, where the telemetry packet and the at least one additional telemetry packet are transmitted in a single burst.

17. The method of claim 11, where the telemetry packet is transmitted to a queue management device.

18. The method of claim 11, where the hardware forwarding component includes a forwarding application specific integrated circuit (ASIC) of the network device.

19. The method of claim 11, further comprising:
   periodically obtaining measurements of queue depth for each of the plurality of network queues;
   periodically generating telemetry packets for the periodically obtained measurements of queue depth; and
   periodically transmitting the periodically generated telemetry packets.

20. The method of claim 11, wherein obtaining the at least one measurement of queue depth comprises:
   obtaining the at least one measurement of queue depth during a keep-alive session associated with the network device.

\* \* \* \* \*